Dec. 3, 1968

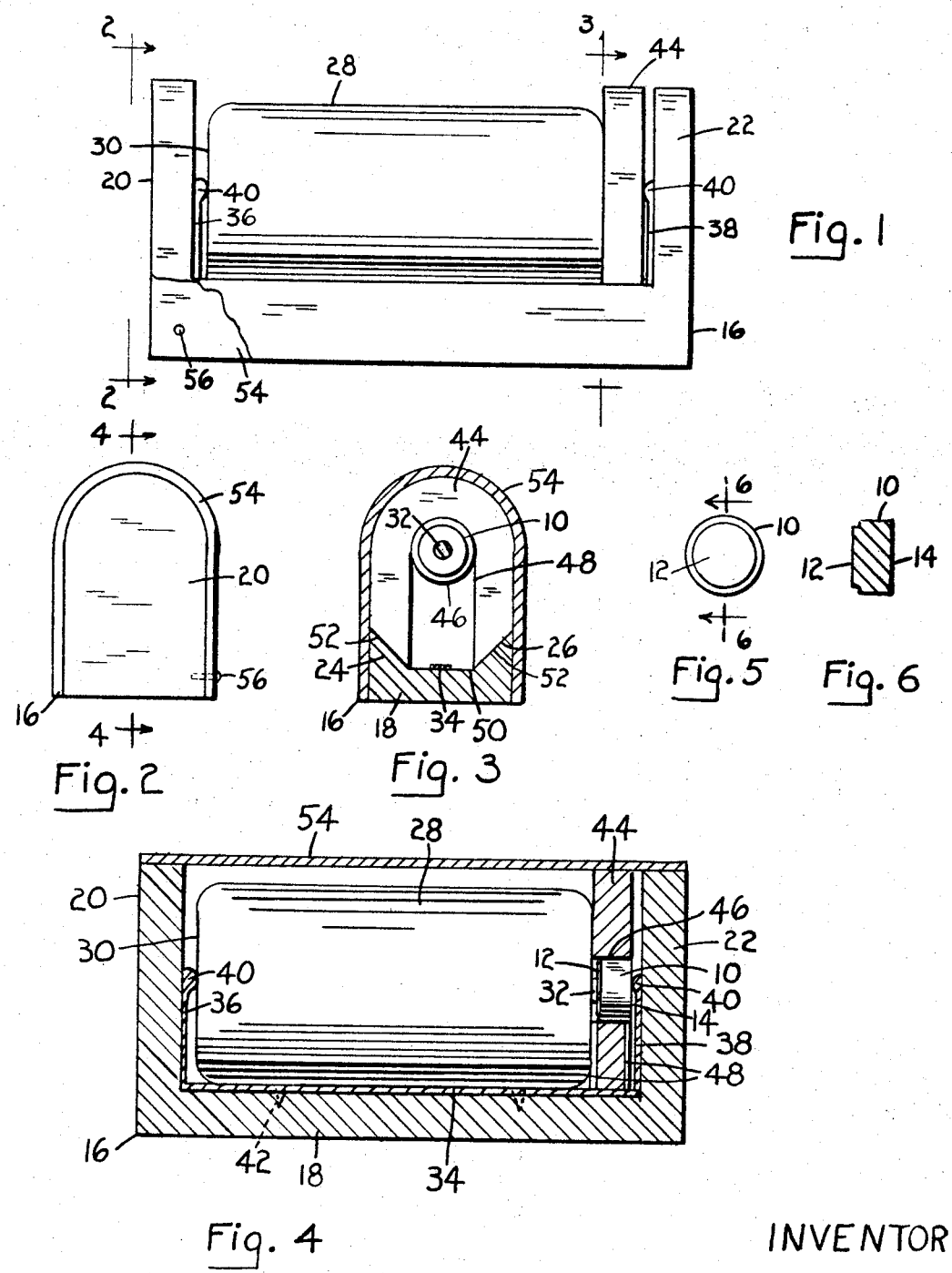

C. C. JASPERSON 3,414,793

HEARING AID BATTERY CHARGER

Filed Aug. 28, 1967

INVENTOR.
CARL C. JASPERSON
BY Eugene M. Eckelman
ATTORNEY

United States Patent Office 3,414,793
Patented Dec. 3, 1968

3,414,793
HEARING AID BATTERY CHARGER
Carl C. Jasperson, Box 737,
Dallesport, Wash. 98617
Continuation-in-part of application Ser. No. 495,101, Oct. 12, 1965. This application Aug. 28, 1967, Ser. No. 667,034
3 Claims. (Cl. 320—5)

ABSTRACT OF THE DISCLOSURE

The instant battery charger includes a body portion and opposite parallel end walls. An electrically conducting strip extends along the end walls and along the body portion of the holder. The portion of the strip which extends along the end walls has terminals, and a charging battery, such as a flashlight battery, is seated on the body portion and is included in a charging circuit with the electrically conducting strip and a battery to be charged. In one embodiment of the invention a removable insert has a socket to support a battery. In another embodiment one end wall of the holder has a socket for supporting the battery to be charged in the circuit.

---

This application comprises a continuation-in-part of application Ser. No. 495,101, filed Oct. 12, 1965, now abandoned, for Hearing Aid Battery Charger.

This invention relates to a hearing aid battery charger.

Certain types of hearing aids utilize small disc-type batteries as their power source, and the users discard such batteries when their energy has been expended. These batteries have a very short life and therefore amount to a considerable expense. It has been found that miniature batteries of this type can be recharged several times, and although they will take reduced charges, a substantial saving can nevertheless be had by recharging them. Devices have not heretofore been provided which were designed for conveniently receiving and holding a small battery such as a hearing aid battery, for charging.

The invention in brief comprises a holder having socket means for removably receiving a battery to be charged. The holder includes a charging circuit in which is incorporated a conventional battery, such as a flashlight battery, and the primary objective of such invention is to provide a holder of the type described arranged such that the battery to be charged is capable of convenient insertion and removal in the charging circuit for the purpose of temporarily placing a battery in the charging circuit.

Another object of the present invention is to provide a battery charger having a novel arrangement of parts for receiving and holding a battery in a charging circuit.

The invention will be better understood and additional objects and advantages will become apparent from the following description taken in connection with the accompanying drawings which illustrate preferred embodiments of the device.

In the drawings:

FIGURE 1 is a side elevational view of a first embodiment of the present battery charger;

FIGURE 2 is an end elevational view taken on the line 2—2 of FIGURE 1;

FIGURE 3 is a sectional view taken on the line 3—3 of FIGURE 1;

FIGURE 4 is a sectional view taken on the line 4—4 of FIGURE 2;

FIGURE 5 is a face view of a miniature disc-type battery commonly in use;

FIGURE 6 is a sectional view of said battery taken on the line 6—6 of FIGURE 5;

Figure 7:
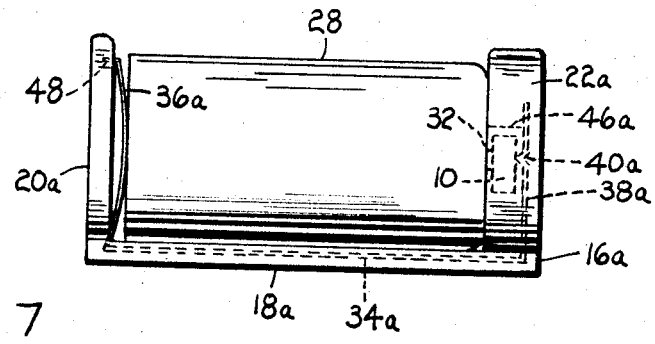
FIGURE 7 is a side elevational view of a second embodiment of the present hearing aid battery charger.
Figure 8:
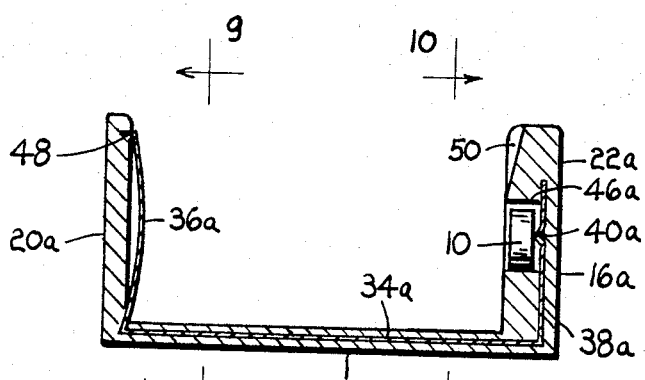
FIGURE 8 is a longitudinal sectional view taken on the line 8—8 of FIGURE 9.
Figure 9:
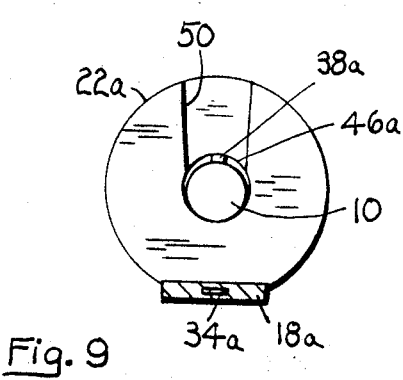
FIGURE 9 is a sectional view taken on the line 9—9 of FIGURE 8.
Figure 10:
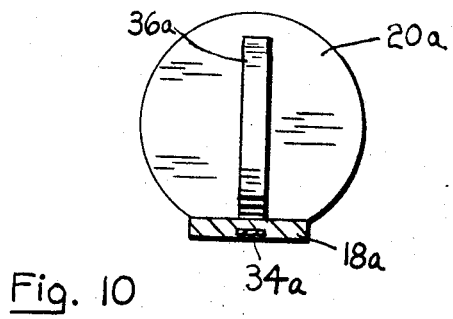
FIGURE 10 is a sectional view taken on the line 10—10 of FIGURE 8.

Referring now in particular to the drawings, the present holder is concerned with charging miniature batteries such as shown in FIGURES 5 and 6. This type of battery is in common use and assumes a disc-type circular shape. It has electrically conducting face or terminal surfaces 12 and 14.

The invention is concerned with a holder for mounting such a hearing aid battery 10 in a charging circuit in order that the battery may be recharged. With reference first to FIGURES 1 through 4, a first form of the holder is designated generally by the numeral 16 and has a bottom wall or body portion 18 and integral parallel end wall portions 20 and 22. As best seen in FIGURE 3, the bottom wall 18 has longitudinally extending, upwardly directed side extensions 24 having inwardly facing inclined surfaces 26 forming a cradle or recess for supporting a conventional cylindrical flashlight battery 28 or the like. The charging battery 28 may of course comprise any type of battery of greater voltage than the hearing aid battery 10. The conventional flashlight battery has been found to effectively serve the present purpose. As is well known, this type of battery has a flat electrically conducting casing surface or terminal at one end 30 and an electrically conducting central projection or terminal 32 at its other end.

An electrically conducting strip 34 is secured along the longitudinal center of the upper surface of bottom wall 18, and has upwardly extending end portions 36 and 38. The upwardly extending portions 36 and 38 have enlarged, inwardly directed contacts 40. The strip 34 is secured to the bottom wall 18 of the holder by suitable fasteners 42.

Removably mounted in the holder 16 is a hearing aid battery holding insert 44 having a central socket or aperture 46 arranged to receive a battery 10 as shown in FIGURE 4. Leading downwardly from the socket 46 on each face surface of the insert 44 is a groove 48 opening through the bottom end of the insert. The bottom edge of the insert is contoured to fit interiorly of the holder and thus has a horizontal central bottom portion 50 which engages the upper surface of bottom wall 18 and upwardly and outwardly angled portions 52 which engage inclined surfaces 26.

The holder is provided with a cover 54. This cover is pivotally attached to the holder adjacent one end thereof, and is open ended and contoured as shown in FIGURE 2 to fit over the top and sides of the holder 16. For gaining access to the interior of the holder, the cover 54 is merely pivoted upwardly.

In the use of the present battery charger, the charging battery 28 is seated in the holder with its flat surface end 30 in engagement with the contact 40 of circuit strip 36, and as stated above is maintained in a central position by the cradle construction of the bottom wall 18. The insert 44 is removed from the holder prior to installation of the charging battery.

Thereupon a battery 10 to be charged is installed in coaxial relationship in socket 46 of the insert 44 while the latter is still removed from the holder. Socket 46 is of a size to receive and frictionally hold a battery 10 in order that the latter will not fall out as the insert is manipulated into and out of the holder but yet allows free insertion and removal of said battery therefrom.

With the battery 10 installed in the insert, the latter is then moved downwardly between the projection end 32 of the battery and the adjacent end of the holder. Such downward movement of the insert past the contact 40 of upright strip 38 and past the projection 32 of the battery 28 is permitted by the opposite grooves 48 which receive such projection and contact. When the insert is fully seated in the holder, the terminal 32 of the charging battery 28 engages one terminal surface of the battery 10 and the contact 40 of end portion 38 engages the other surface of battery 10. Thus, a charging circuit flows through the battery 10, the latter being maintained in the charging circuit for a selected time to accomplish a suitable recharging function.

Insertion and removal of the battery 10 from the socket 46 is readily accomplished by suitable end coaxial movement thereof into or out of said socket. It is desired that the circuit strip portions 36 and 38 be angled inwardly toward each other a slight amount in order to take up any slack which may exist in the overall longitudinal dimension of the parts, and for this purpose it is preferred that said circuit strip portions be constructed of an electrically conducting spring metal.

FIGURES 7 to 10 show a second embodiment of the battery charger, designated generally by the numeral 16a. Similarly, this embodiment has a body portion or bottom wall 18a and integral parallel end wall portions 20a and 22a. End wall 22a has a circular socket 46a adapted freely to receive a hearing aid battery 10. An electrically conducting strip 34a is embedded longitudinally in the body portion 18a and has upwardly extending end portions 36a and 38a. End portion 36a extends along the inner surface of the one end wall portion 28 and has an upper right angle tab end 48 anchored in the wall portion 20a. The end strip portion 38a is embedded in the end wall 22a and is arranged to extend through the socket along the bottom of the latter. This strip portion has a projecting contact 40a.

The parts are dimensioned and arranged such that a conventional flashlight battery 28 is adapted to be seated on the body portion 18 between the end wall portions 20a and 22a. Before inserting the charging battery 28, a hearing aid battery 10 is inserted in the socket 46a. Then, when the charging battery 28 is positioned in the holder the projecting terminal 32 thereof engages one terminal surface of the hearing aid battery and holds the opposite terminal surface into engagement with contact 40a. The end portion 36a of the electrically conducting strip 34a engages the opposite end of the battery and a circuit is thus complete through the two batteries. The end portion 36a is of spring metal and has a bowed construction which serves to hold the battery 28 in place but also provides sufficient longitudinal clearance between the end wall portions 20a and 22a to allow insertion and removal of the battery 28. FIGURE 7 shows both batteries mounted in the holder in a charging position. In a preferred construction a tapered notch 50 leads downwardly from the upper edge of the wall portion 22a to assist in guiding the charging battery centrally into the holder. Notch 50 receives the projecting terminal 32 of the charging battery in such guiding movement.

It is to be understood that the forms of my invention herein shown and described are to be taken as preferred examples of the same and that various changes in the shape, size and arrangement of parts may be resorted to without departing from the spirit of my invention or the scope of the subjoined claims.

Having thus described my invention, I claim:

1. A charging device for hearing aid batteries comprising
    (a) a holder having a body portion with a bottom wall,
    (b) a pair of end walls projecting angularly from said body portion in substantially parallel relation and arranged with said bottom wall to receive and support a charging battery therebetween having opposite terminals,
    (c) said wall portions having surface areas facing each other,
    (d) one of said surfaces having a socket therein arranged to removably hold a battery to be charged in a position such that one of its terminals is in circuit engagement with one terminal of the charging battery,
    (e) and an electrically conducting strip having a portion thereof extending into said socket for engagement with the other terminal of a battery to be charged,
    (f) said electrically conducting strip extending to the other end of said holder and being arranged to electrically connect the other terminal of said battery to be charged with the other terminal of the charging battery.

2. The charging device of claim 1 wherein the end wall which has the socket is provided with a notch leading from an outer edge of the said end wall toward said socket to assist in inserting a battery to be charged into said holder.

3. The charging device of claim 1 wherein the wall portion which is provided with said socket includes a removable insert portion and said socket is provided in said insert.

References Cited

UNITED STATES PATENTS

| | | | |
|---|---|---|---|
| 2,036,547 | 4/1936 | Siemon | 320—4 |
| 2,418,141 | 4/1947 | Salazar | 320—2 |
| 2,451,726 | 10/1948 | Fry | 320—4 |
| 2,588,962 | 3/1952 | Carlson | 136—16 X |
| 3,307,096 | 2/1967 | Lyon | 320—15 |
| 3,309,598 | 3/1967 | Montgomery et al. | 320—2 |
| 3,297,932 | 1/1967 | Murphy | 320—2 |
| 3,344,334 | 9/1967 | Rubin | 320—2 |
| D. 147,151 | 7/1947 | Schinske | D320—4 X |

LEE T. HIX, *Primary Examiner.*

S. WEINBERG, *Assistant Examiner.*